UNITED STATES PATENT OFFICE.

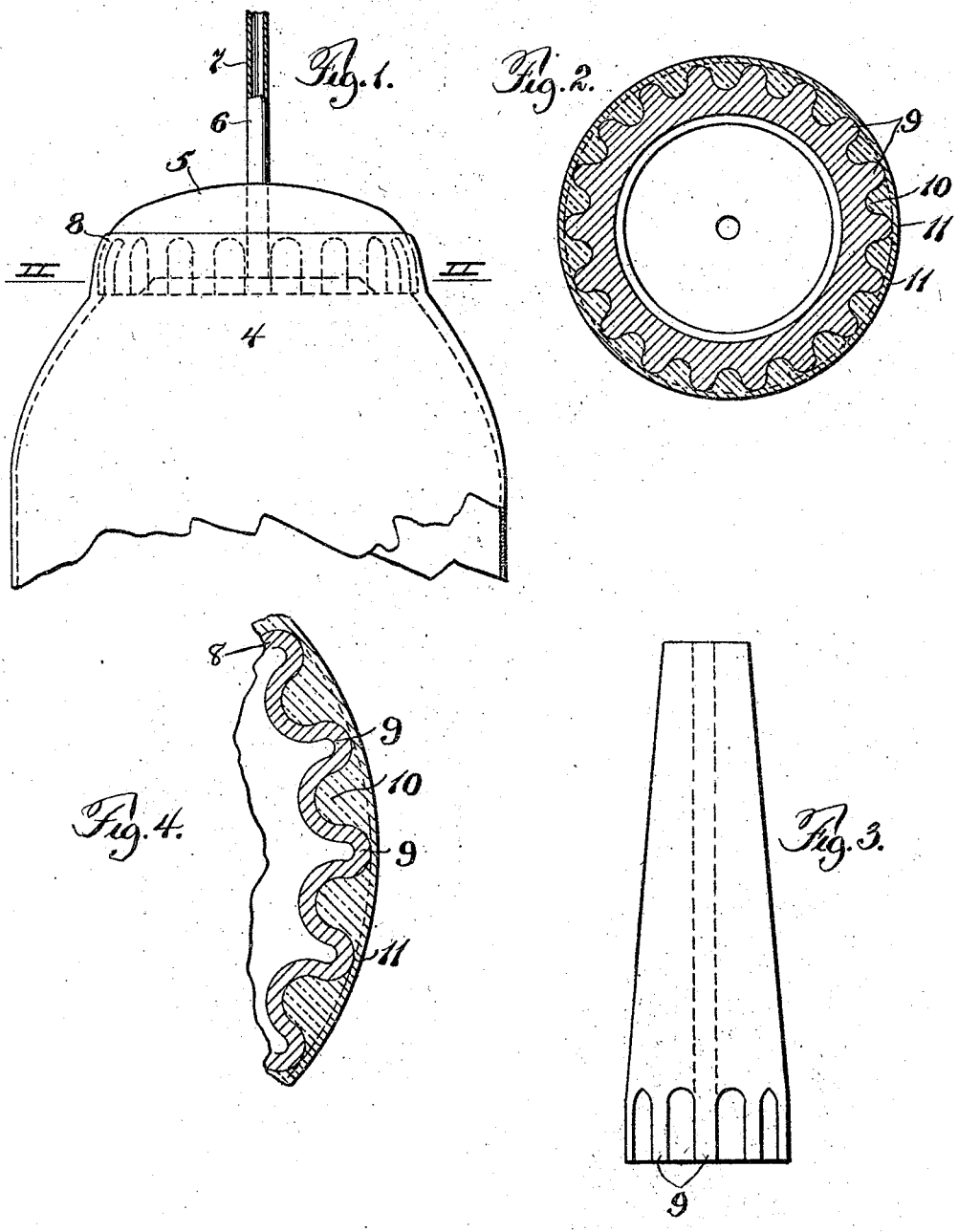

GEORGE E. MOORE, OF ARNOLD, PENNSYLVANIA, ASSIGNOR TO PITTSBURG PLATE GLASS COMPANY, OF PITTSBURGH, PENNSYLVANIA, A CORPORATION OF PENNSYLVANIA.

BAIT FOR DRAWING GLASS CYLINDERS.

1,138,885.

Specification of Letters Patent. Patented May 11, 1915.

Application filed March 30, 1909. Serial No. 486,823.

*To all whom it may concern:*

Be it known that I, GEORGE E. MOORE, a citizen of the United States, residing at Arnold, in the county of Westmoreland and State of Pennsylvania, have invented certain new and useful Improvements in Baits for Drawing Glass Cylinders, of which the following is a specification.

This invention has for its primary objects, the construction of a bait for drawing glass cylinders which will secure a better hold on the glass than those forms of construction heretofore used, and which will retain that hold more effectively and for a longer period of time, and without the same liability of breakage or cracking of the glass as it cools.

In order that the invention may be better understood, I will proceed to describe the same in connection with the accompanying drawing, wherein—

Figure 1 is a side elevation showing a bait constructed in accordance with my improvement, with the upper end of the glass cylinder attached thereto;

Figure 2 is a sectional view on the line II—II of Figure 1;

Figure 3 illustrates a modified form of bait with my improvement embodied therein, such last mentioned modification being arranged for the formation of a cylinder with a small neck portion, and Figure 4 indicates a partial broken view of another detail section.

Referring now more particularly to Figure 1, it will be seen that the upper end of the cylinder indicated at 4 is shown as attached to a broad extended mushroom shaped part marked 5 that is attached to a pipe 6, the opening 7 whereof extends downward as indicated by the dotted lines, through the part 5 to the interior of the cylinder, the outer rim or periphery of the part 5 having a downwardly extending projection circumferentially disposed as indicated at 8.

The outer surface of the periphery of the body 5 of the bait I arrange in the shape of corrugations or scallops as indicated at 9 in Figure 2, said scallops giving the outer circumference of the lower portion of the body of the bait the appearance of a rough gear wheel, the roots of the teeth whereof and the outer ends of the teeth are curved or rounded as shown, to avoid any sharp edges.

It will be seen on examination of Figure 2 that the glass when in a plastic state will lodge in the depressions or grooves between the adjacent teeth 9, forming a thick body of the material as indicated at 10 which will retain the heat longer and better than the thinner portion indicated at 11 which is at the apex of the teeth or projections, and as shown in the drawing operation, the color in between the teeth or ridges is considerably redder and darker than that at the point marked 11, and this greater heat retained within the grooves or channels by the larger body of glass therein lodged aids to retain the mass in a more plastic and tougher condition and renders it less liable to breakage, besides securing a better hold on the bait than has heretofore been obtained by the employment of a bait of smooth cylindrical outer surface.

In Figure 3 I have shown a bait having a slightly different distribution of metal than the device of Figs. 1 and 2, but being substantially similar in all other respects.

As indicated in Figure 4, it is possible to slightly vary the configuration of the surface of the bait or the construction of the same, as for example by the formation of the depending part 8 in the shape of a serpentine or convoluted corrugation, the inner surface conforming somewhat to the outer surface. It is possible also that other slight variations in detail could be introduced without departing from the spirit of the invention, provided the feature of arranging the part of the bait which engages the glass in such manner as to produce in alternation around the periphery of the cylinder a succession of thicker and thinner parts so that the heat of the larger body of glass in the thicker portions will aid in tempering the balance and retain the heat longer, and prevent greater tendency to crack, where all the glass is thin and cooled rapidly.

Besides the advantages before specified my improved bait produces a greater thickness of the cylinder at the cap or upper end where greater strength is desirable, and thus makes it practicable to increase the length of the draw.

Having thus described my invention and illustrated its use, what I claim as new and desire to secure by Letters Patent, is the following:

A metal bait for drawing glass cylinders, comprising a body portion provided with an annular glass engaging portion one side surface of which is provided with flutes extending a portion of the distance to the upper part of the glass engaging portion and the other surface being substantially smooth.

In testimony whereof I have hereunto signed my name in the presence of the subscribed witnesses.

GEORGE E. MOORE.

Witnesses:
S. H. ISRAEL,
BAUMER M. ALLEN.